United States Patent Office 3,270,046
Patented August 30, 1966

3,270,046
PREPARATION OF ARYL HYDROXYBENZOATES
Dale E. Keeler, Sanford, Mich., assignor to The Dow Chemical Company, Midland, Mich., a corporation of Delaware
No Drawing. Filed Mar. 13, 1963, Ser. No. 264,768
2 Claims. (Cl. 260—474)

The present invention is concerned with a new chemical process and it particularly relates to an improved method for making aryl esters of hydroxybenzoic acids.

Esters such as salol, tert-butylphenyl salicylate, and similar phenyl esters of hydroxybenzoic acids are usually made by the reaction of a phenol with the hydroxybenzoic acid in the presence of phosphorus oxychloride or phosphorus pentachloride. Although this is an effective method, it has serious disadvantages, particularly when it is practiced on a commercial scale. It is necessary to use the phosphorus chloride reagent in relatively large quantity and the correspondingly large quantity of phosphoric acid byproduct which is obtained complicates and prolongs the work-up of the reaction product. Residues of considerable size are usually produced and these represent additional economic disadvantages of the process.

It has now been found that phenyl esters of hydroxybenzoic acids are prepared in good yields with shorter process times, less waste products, and easy recovery of the ester product by a simplified process wherein a hydroxybenzoic acid and a phenyl ester of a lower alkane monocarboxylic acid are heated together in the presence of a small quantity of an esterification catalyst, thereby forming the phenyl hydroxybenzoate and the free lower alkanoic acid. Preferably, the latter is distilled from the reaction mixture substantially as it is formed to insure essential completion of the reaction.

Acidolysis reactions wherein there is splitting of an ester when heated with an acid under esterifying conditions are broadly known and have been used to transform an ester of one acid into the corresponding ester of another acid. However, this mode of esterification has not been applied to acids such as salicylic acid, p-hydroxybenzoic acid, and other hydroxybenzoic acids. In acids such as these, there is present in the acid molecule in addition to the carboxylic acid group a phenolic hydroxyl, a reactive group which is capable of undergoing several kinds of esterification or condensation reactions under the reaction conditions. For example, these acids commonly form anhydrides, internal esters, or polyesters with themselves when heated in the presence of esterification or condensation catalysts.

Therefore, it is surprising and unexpected to find that these hydroxybenzoic acids react with phenyl alkanoates under esterifying conditions to produce essentially only the phenyl hydroxybenzoate and the free alkanoic acid. This desirable result is obtained when the reaction is carried out within certain limits as specified below.

The hydroxybenzoic acids found to be advantageously esterified in this process include salicylic acid, m-hydroxybenzoic acid, p-hydroxybenzoic acid, and these acids having one or more ring substituents which are unreactive under the process conditions such as lower alkyl, lower alkoxy, and halogen.

The phenyl alkanoate reactant is a phenyl ester of an unsubstituted lower alkane monocarboxylic acid such as acetic acid, propionic acid, or butyric acid. A phenyl ester of acetic acid is preferred. By the term phenyl, as used in this specification and the appended claims, is meant not only unsubstituted phenyl, but also phenyl substituted with one or more groups which are unreactive in the process, and phenyl therefore includes halophenyl, lower alkylphenyl, and lower alkoxyphenyl.

Any of the known acidic esterification catalysts may be employed in the process. Representative catalysts are sulfuric acid, toluenesulfonic acid, phosphoric acid, boric acid, and strongly acidic cation exchange resins. The concentration of catalyst is that conventionally used in esterification reactions. About 0.05–1 percent of catalyst based on the weight of the reaction mixture is suitable.

For best results, it is preferred to use about one to about three moles of phenyl acetate to one mole of hydroxybenzoic acid. Proportions outside this range are also operable but are less desirable for economic reasons. It is not necessary to use highly purified reactants and the process gives good results with technical grades of materials.

The acidolysis reaction is advantageously operated within an approximate temperature range of 110–120° C. Below about 110° C., the reaction is impractically slow and above about 200° C., rapidly increasing decomposition reactions set in, causing color formation and loss of product. The reaction is essentially complete within about 1–10 hours in this temperature range. Usually, a reaction temperature of 150–180° C. is preferred.

A preferred mode of operation of the process, as adapted to the production of salol, comprises heating a reaction mixture containing about two moles of phenyl acetate and one mole of salicylic acid, together with a small quantity of an acidic esterification catalyst, at a temperature of 150–180° C. while holding the pressure in the system at such a level that there is maintained a steady reflux of phenyl acetate. Using a suitable distillation column and fractionation head, acetic acid is distilled off and and separated from the reaction mixture substantially as it is formed. Under these conditions, the reaction is completed within about two hours. The excess phenyl acetate and the salol product are then separated from the reaction mixture by any conventional procedure. Preferably, these are fractionally distilled directly from the reaction mixture.

A particularly advantageous procedure for commercial operation includes retaining in the reactor all, or substantially all of the residue from the distillation of the product ester and merely adding fresh reactants to this byproduct residue after each run, then proceeding as before. It has been found that by operating in this manner, the residue reaches a relatively constant level after two or three such cycles and this level is not substantially higher than the amount of residue produced in a single isolated run. In other words, in successive runs there is essentially no additional residue of byproducts produced and the yields of ester are nearly quantitative. Also, when operating in this fashion, consumption of acidic catalyst is minimized and after two or three cycles of operation little or no additional acid catalyst is required.

*Example 1*

A mixture of 69 g. of salicylic acid, 136 g. of phenyl acetate, and 0.5 g. of p-toluenesulfonic acid was put in a reactor flask equipped with a mechanical stirrer, a short distillation column, and a vacuum distillation head. The mixture was heated at 170–180° C. for about two hours while maintaining a reflux of phenyl acetate by adjusting the pressure in the system as needed between 150 mm. and 350 mm. of Hg absolute. Acetic acid was removed by distillation as it was produced by the reaction. Excess phenyl acetate was then separated from the reaction mixture by distillation under reduced pressure. The distillation residue was dissolved in 200 ml. of toluene and this solution was washed first with 100 ml. of 0.5 N-sodium hydroxide and then with four 50 ml. portions of water. The toluene was stripped from the washed solution under reduced pressure and the residue was distilled at 0.2–1 mm. to give 85 g. of salol.

*Example 2*

A reactor flask such as used in Example 1 was charged with a mixture of 138 g. of salicylic acid, 272 g. of phenyl acetate, and 2 g. of p-toluenesulfonic acid. Heat was applied and the pressure in the system was reduced to 300 mm. Acetic acid began to distill when the pot temperature reached 165° C. Heating was continued for about two hours during which time 60 g. of acetic acid was removed and the pot temperature increased to 180° C. at 225 mm. The excess of phenyl acetate was removed by distillation while the pressure was progressively lowered, thereby allowing the pot temperature to drop to 120° C. The salol product was then distilled from the reactor flask at 0.2–0.6 mm. The yield of salol was about 80 percent of the theoretical, based on the salicylic acid charged.

*Examples 3–6*

A series of runs was made as in Example 2 but wherein the residue from the previous run was left in the reactor flask and fresh reactants were added for the next run as shown in Table I. The phenyl acetate used in each run after the first was that recovered from the previous run together with sufficient fresh material to give a ratio of about two moles of phenyl acetate to one mole of salicylic acid. Quantities are given in grams.

TABLE I

| Run No. | Starting Materials | | | Products | |
|---|---|---|---|---|---|
| | Salicylic Acid | Phenyl Acetate | p-Toluene-Sulfonic Acid | Distilled Salol | Cumulative Residue |
| 3 | 138 | 380 | 1.0 | 163.5 | 34.2 |
| 4 | 138 | 272 | 0.5 | 183.6 | 42.6 |
| 5 | 138 | 272 | 0.5 | 193.4 | 42.6 |
| 6 | 138 | 272 | 1.0 | 204.6 | 40.0 |

The amount of residue shown represents the total quantity of residue present in the pot at the end of each run after distillation of the salol. As can be seen from the above figures, the formation of additional residue ceased after the second run of the series while the yield of salol increased. The quality of the distilled salol remained constant at about 96–97 percent purity.

*Example 7*

By the procedure of Example 2, p-tert-butylphenyl acetate and salicyclic acid in 2/1 molar proportion were reacted in the presence of a catalytic quantity of p-toluenesulfonic acid to produce p-tert-butylphenyl salicylate in a yield and of a quantity similar to those shown above.

*Example 8*

In a similar manner, m-hydroxybenzoic acid and phenyl acetate were reacted in the presence of p-toluenesulfonic acid to make phenyl m-hydroxybenzoate.

Results similar to those shown above were obtained when the p-toluenesulfonic acid catalyst was replaced by the other known esterification catalysts such as sulfuric acid, phosphoric acid, boric acid, and Dowex 50, a strongly acidic cation exchange resin. In a series of runs carried out as in Examples 3–6, addition of further catalyst is unnecessary after the first two or three runs, sufficient catalyst then remaining in the residue. Similarly, phenyl propionate was found to be equivalent in the process to phenyl acetate. Other phenyl lower alkanoates such as phenyl butyrate, tolyl acetate, p-chlorophenyl acetate, and methoxyphenyl acetate react in the same way. Phenyl esters of other ar-hydroxybenzoic acid such as p-hydroxybenzoic acid, ar-hydroxytoluic acid, 5-chlorosalicyclic acid, and vanillic acid are prepared in comparable yield and quality by the general procedure shown above.

I claim:
1. A process for making a phenyl hydroxybenzoate which comprises the steps:
   (1) contacting a hydroxybenzoic acid with a phenyl lower alkanoate at 110–200° C. in the presence of an acidic esterfication catalyst;
   (2) subjecting the thereby formed reaction mixture to fractional distillation, thereby obtaining a distilled phenyl hydroxybenzoate fraction and a distillation residue; and
   (3) recycling at least a substantial part of said residue to the first step.
2. A process for making salol which comprises the steps:
   (1) contacting a mole of salicyclic acid with 1–3 moles of phenyl acetate at 110–200° C., in the presence of an acidic esterification catalyst;
   (2) subjecting the thereby formed reaction mixture to fractional distillation, thereby obtaining a distilled salol fraction and a distillation residue; and
   (3) recycling at least a substantial part of said residue to the first step.

References Cited by the Examiner

Groggins, "Unit Processes in Organic Synthesis" (1958), pages 701, 702, 715, 726.

Sowa. "Organic Reaction With Boron Fluoride: Acidolysis of Esters" J.A.C.S., vol. 60 (1938), pp. 654–55.

Weissberger, "Technique of Organic Chemistry," vol. VIII, "Investigation of Rate and Mechanism of Reactions" (1953) pages 422–23.

LORRAINE A. WEINBERGER, *Primary Examiner.*

DANIEL D. HORWITZ, *Examiner.*

S. B. WILLIAMS, *Assistant Examiner.*